US009280502B1

(12) United States Patent
Ju

(10) Patent No.: US 9,280,502 B1
(45) Date of Patent: *Mar. 8, 2016

(54) MINIMAL-COST PSEUDO-ROUND-ROBIN ARBITER

(71) Applicant: Ambarella, Inc., Santa Clara, CA (US)

(72) Inventor: Chishein Ju, Cupertino, CA (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/250,904

(22) Filed: Apr. 11, 2014

Related U.S. Application Data

(63) Continuation of application No. 12/750,791, filed on Mar. 31, 2010, now Pat. No. 8,732,369.

(51) Int. Cl.
*G06F 12/00* (2006.01)
*G06F 13/362* (2006.01)
*G06F 9/50* (2006.01)

(52) U.S. Cl.
CPC ............ *G06F 13/362* (2013.01); *G06F 9/5011* (2013.01)

(58) Field of Classification Search
CPC ................ G06F 13/362; G06F 9/5011; G06F 2209/5021
See application file for complete search history.

(56) References Cited

U.S. PATENT DOCUMENTS

| 5,463,624 | A | | 10/1995 | Hogg et al. | 370/461 |
|---|---|---|---|---|---|
| 5,561,669 | A | | 10/1996 | Lenney et al. | 370/352 |
| 5,627,745 | A | | 5/1997 | Flood | 700/2 |
| 5,923,859 | A | * | 7/1999 | Melo et al. | 710/113 |
| 6,119,188 | A | * | 9/2000 | Sheafor et al. | 710/107 |
| 6,426,957 | B1 | | 7/2002 | Hauser et al. | 370/413 |
| 7,706,387 | B1 | | 4/2010 | Gibson | 370/395.42 |
| 2002/0129181 | A1 | * | 9/2002 | Lahiri et al. | 710/113 |
| 2004/0156323 | A1 | * | 8/2004 | Cao | 370/258 |
| 2007/0113023 | A1 | | 5/2007 | Aruiambalam et al. | 711/147 |
| 2007/0223376 | A1 | | 9/2007 | Soloviev | 370/230 |
| 2008/0198815 | A1 | | 8/2008 | Liu | 370/336 |
| 2009/0132736 | A1 | * | 5/2009 | Hasan et al. | 710/56 |
| 2010/0325327 | A1 | * | 12/2010 | Marietta et al. | 710/240 |

* cited by examiner

*Primary Examiner* — Nimesh G Patel
(74) *Attorney, Agent, or Firm* — Christopher P. Maiorana, PC

(57) ABSTRACT

An apparatus including a first register, a second register, and a control logic. The first register may be configured to store requests from a plurality of clients for a current cycle. The second register may be configured to store an indicator value indicating which of the plurality of clients received a grant in a previous cycle. The control logic may be configured to determine which of the plurality of clients having a request in the current cycle receives a grant based upon (i) a pointer value and (ii) the indicator value.

20 Claims, 3 Drawing Sheets

MINIMAL-COST PSEUDO-ROUND-ROBIN ARBITER

This application relates to U.S. Ser. No. 12/750,791, filed Mar. 31, 2010, now U.S. Pat. No. 8,732,368, which is incorporated by reference in its entirety.

FIELD OF THE INVENTION

The present invention relates to a method and/or architecture for controlling resource allocation generally and, more particularly, to a minimal-cost pseudo-round-robin arbiter.

BACKGROUND OF THE INVENTION

In a conventional digital logic design, a memory can be shared by many clients. To facilitate the shared memory, a common memory interface is provided for all the clients. A memory arbiter is provided on the memory interface to arbitrate the 'right of way' for the requesting clients to access the memory.

Different arbitration schemes can be implemented in an arbiter. One such scheme is a Fixed Priority scheme. The Fixed Priority scheme pre-assigns clients to a fixed priority order with the fixed priority order. When more than one client are requesting at the same time, the highest priority client is always granted the right of access. The Fixed Priority scheme is the easiest to implement. However, the Fixed Priority scheme is unfair.

Another arbitration scheme is a Round-Robin scheme. Round-Robin arbiter makes sure that every requesting client has equal access rights by allocating round-robin slots for every client. However, the round-robin scheme gets very complicated when a slot is allocated to a client that is not requesting. Because memory bandwidth is too precious to go unutilized, the Round-Robin arbiter needs to re-allocate the slot to a requesting client that is waiting next in line. The Round-Robin arbiter needs also to move the granted client to the end of the line.

A real Round-Robin arbiter with absolute fairness is very costly. A conventional Round-Robin arbiter involves a weight counter for every client and associated logic. Overall, it takes a lot of logic circuitry to maintain both memory utilization and client fairness in a Round-Robin arbiter. Since the amount of logic directly translates to cost of manufacturing, it would be desirable to achieve round-robin functionality with less logic.

SUMMARY OF THE INVENTION

The present invention concerns an apparatus including a first register, a second register, and a control logic. The first register may be configured to store requests from a plurality of clients for a current cycle. The second register may be configured to store an indicator value indicating which of the plurality of clients received a grant in a previous cycle. The control logic may be configured to determine which of the plurality of clients having a request in the current cycle receives a grant based upon (i) a pointer value and (ii) the indicator value.

The objects, features and advantages of the present invention include providing a minimal-cost pseudo-round-robin arbiter that may (i) ensure higher memory bandwidth utilization, (ii) maintain acceptable fairness, and/or (iii) use minimal logic circuitry.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
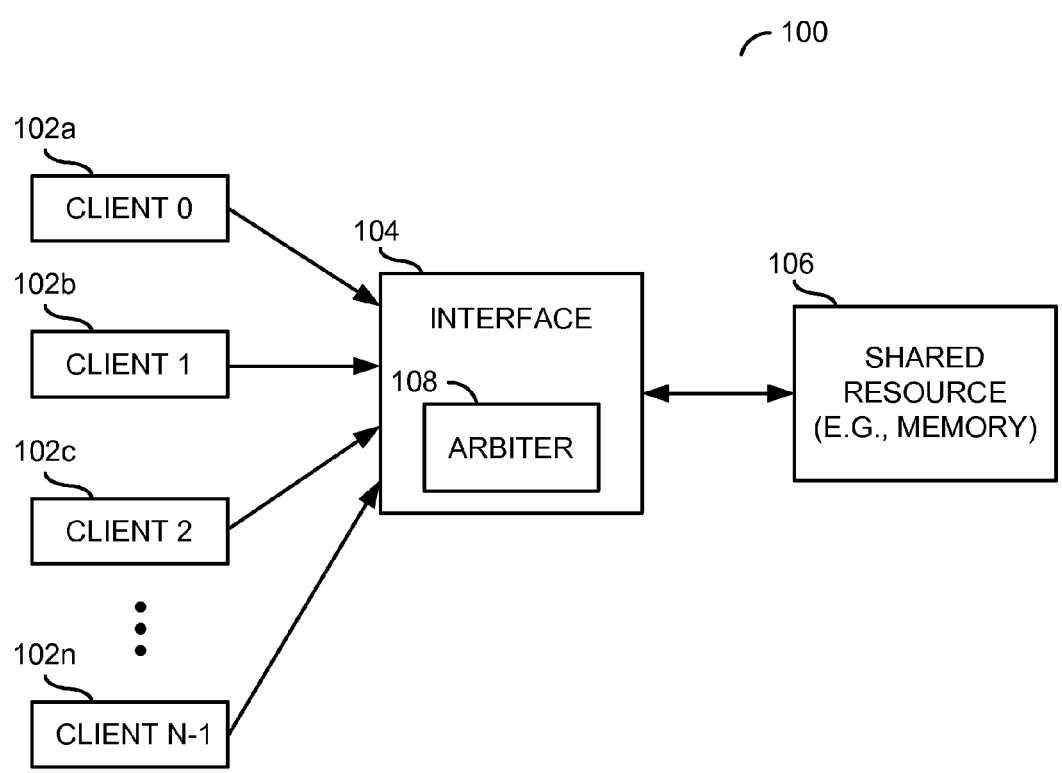
FIG. 1 is a block diagram illustrating a system implementing an embodiment of the present invention.

Referring to FIG. 1, a block diagram is shown illustrating a system 100 in which an arbiter in accordance with an example embodiment of the present invention may be implemented. In one example, the system 100 may comprise a plurality of clients 102a-102n, an interface 104 and a shared resource 106. The interface 104 may be configured to provide each client 102a-102n with a common interface for accessing the shared resource 106. In one example, the interface 104 may be implemented as a memory interface and the shared resource 106 may comprise a memory. However, other resources may be implemented accordingly to meet the design criteria of a particular implementation.

In one example, the memory 106 may be shared among the clients 102a-102n based upon a pseudo-round-robin scheme. Each of the clients 102a-102n may send requests for access to the memory 106 to the memory interface 104. The memory interface 104 may be configured to issue grants using the pseudo-round-robin arbitration scheme in accordance with the present invention. For example, the memory interface 104 may be configured to grant access to the memory 106 to particular ones of the clients 102a-102n based upon a current request, a round-robin slot, and grant history.

In one example, the memory interface 104 may include an arbiter 108. The arbiter 108 may be configured to implement the pseudo-round-robin arbitration scheme in accordance with an embodiment of the present invention. The arbiter 108 may be configured to receive the requests from the clients 102a-102n, allocate the round-robin slot on a per cycle basis, maintain a history of the previous granted client, and issue a grant for the current cycle to one of the clients 102a-102n.

Figure 2:
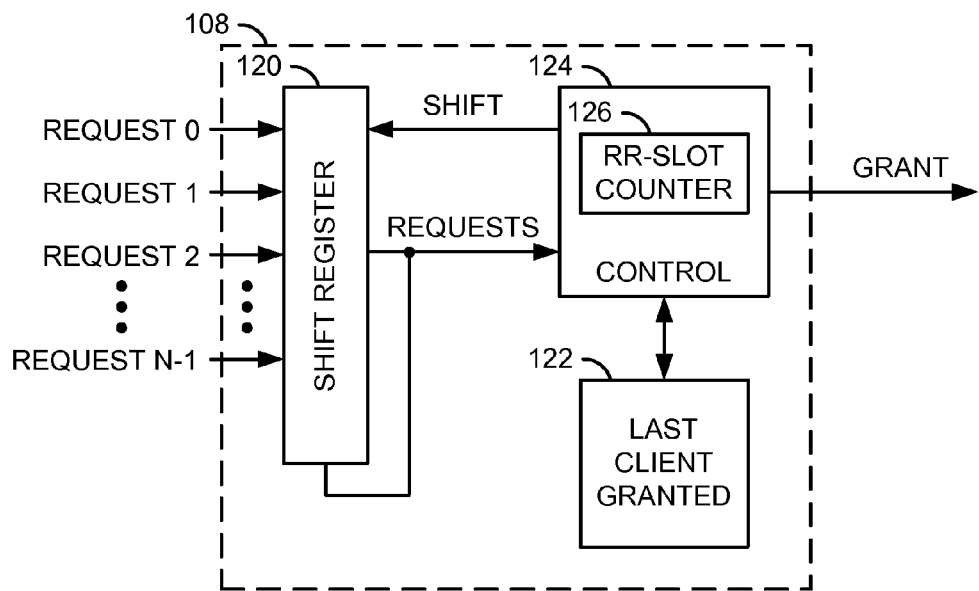
FIG. 2 is a block diagram illustrating an example arbiter in accordance with an example embodiment of the present invention.

Referring to FIG. 2, a block diagram is shown illustrating an example implementation of the arbiter 108 of FIG. 1. In one example, the arbiter 108 may comprise a first register 120, a second register 122, and control logic 124. In one example, the register 120 may be implemented as an N-bit shift register, where N represents the total number of clients. The register 122 may be implemented as a log(2)N bit register. The register 122 may be configured to store a history of which client was granted in a previous cycle. For example, the client number of the last granted client may be stored in the register 122.

The arbiter 108 may have a number of inputs that may receive request signals (e.g., REQUEST 0-REQUEST N–1) from the clients 102a-102n. The signals REQUEST 0-REQUEST N–1 may be implemented, in one example, as single bit flags indicating whether the client is requesting (e.g., "1", or a logic HIGH) or not requesting (e.g., "0", or a logic LOW).

In one example, the signals REQUEST 0-REQUEST N–1 may be presented to a plurality of parallel inputs of the register 120. The register 120 may have an output that may present a signal (e.g., REQUESTS) to an input of the control logic 124 and a control input that may receive a signal (e.g., SHIFT) from the control logic 124. The signal SHIFT may be implemented as a control signal. In one example, the signal SHIFT may be configured to select the client to which the current round-robin slot is allocated. In one example, the register 120 may be configured to shift data stored therein a number of bits specified by the signal SHIFT. In another example, the signal SHIFT may cause the data stored in the register 120 to shift the specified number of bits. When the data in the register 120 is shifted, the output of the register 120 may be fed back into a serial input of register 120.

The signal REQUESTS generally presents a bit map (e.g., 1 or 0) representing the state of the signals REQUEST 0-REQUEST N−1. In one example, the signal REQUESTS may be implemented as a parallel output of the register 120. The control logic 124 may be configured to read the signal REQUESTS after the binary shift is performed in response to the signal SHIFT. The request information from all clients may be used by the control logic 124 to make a final selection for issuing a grant. The register 120 may be configured to perform the binary shifting to give the control logic 124 the convenience of always starting with a fixed location (e.g., the most significant bit (MSB)).

The register 122 may have an input/output that may communicate data with an input/output of the control logic 124. In one example, the data communicated and stored in the register 122 may comprise information (e.g., client number) regarding the last client issued a grant by the control logic 124. The control logic 124 may also have a first output that may present the signal SHIFT and a second output that may present a signal (e.g., GRANT). The signal GRANT may be used to control which client gets access to the shared resource 106.

In one example, the control logic 124 may include a counter 126. The counter 126 may be implemented, in one example, as a log(2)N bit counter. The counter 126 may be configured to keep track of which client should be first in line for allocation of the round-robin slot. The counter 126 may be initialized to 0 at start up and incremented by 1 for every cycle (e.g., in response to a cycle clock). When the counter value reaches N−1, the value is generally reset (or rolls-over) to 0 in the next cycle. In one example, the signal SHIFT may be configured to present the current count value from the counter 126.

Figure 3:
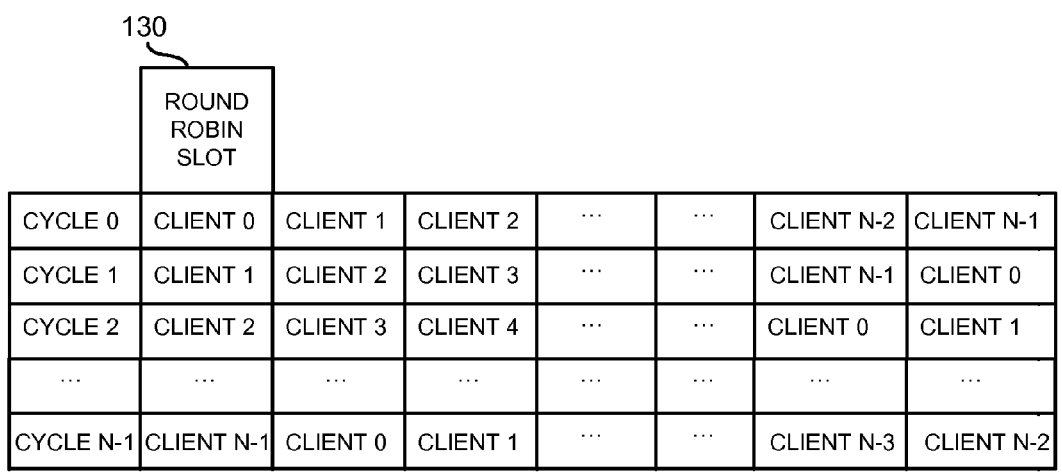
FIG. 3 is a diagram illustrating operation of a shift register of FIG. 2 over a number of cycles.

As discussed above, the signal REQUESTS from the shift register 120 may comprise the post-shift register value, or a bit map of all requests. Because the signal REQUESTS represents the post-shift register bit map, the client first-in-line is at the MSB, the client second-in-line is at the second MSB, and so on (as illustrated in FIG. 3).

With the bit map received via the signal REQUESTS, the control logic 124 may, in one example, first mask a potentially active request bit from the last granted client. The last granted client is generally indicated by the value stored in the register 122. In one example, the control logic 124 may perform an AND-with-0 operation on the bit corresponding to the client indicated by the value in the register 122. The AND-with-0 operation effectively inverts a bit value of 1 to a 0, but leaves a bit value of 0 as is. The AND-with-0 operation results in a modified bit map that effectively masks out the potential active bit from the last granted client.

With the modified bit map, the control logic 124, starting with the MSB and moving 1 bit at a time to the next significant bit (e.g., moving left-to-right), generates the output GRANT to be, in one example, the client number represented by the first bit having a value of 1. Referring to FIG. 3, the client number at a particular bit location in the bit map received from the register 120 may be determined using the following rules:

If (SHIFT+distance-to-MSB) is less than N, then client no.=(SHIFT+distance-to-MSB);

If (SHIFT+distance-to-MSB) is greater than or equal to N, then client no.=(SHIFT+distance-to-MSB−N).

When the control logic 124 has finished checking every bit in the modified bit map (e.g., from MSB to LSB) and finds that there is no active request (e.g., every bit is 0), the control logic 124 checks whether the original bit map may have contained a 1 in the masked out location (e.g., where the last granted client is located). If the original bit map contained a 1 in the masked out location, a grant is generated to the client granted in the last cycle. If the original bit map contains a 0 in the masked out location, no grant is generated for the current cycle because nobody is requesting. By granting the request of last granted client when no other client is requesting, the control logic 124 generally assures that memory bandwidth is not wasted. When the granted client is determined, the control logic 124 updates the last granted client value stored in the register 122 for the next cycle. If no grant is generated, the last granted client value in the register 122 is left unchanged.

Referring to FIG. 3, a diagram is shown illustrating an example operation of the register 120 of FIG. 2. The round-robin slot may move (be re-allocated) every cycle from Client 0 to Client 1, to Client 2, to Client N−1, and back to Client 0. The client allocated the round-robin slot may be granted access to the shared resource 106 if:

1. the client happens to be requesting, and
2. the client is not the client that was just granted in the previous cycle.

If one of the two conditions is not met, the arbiter 108 may check the next client (e.g., by incrementing the client number). The arbiter 108 may continue checking next clients (wrapping around from N−1 to 0), until the arbiter 108 returns to the first requesting client, or until the arbiter comes back to itself (in which case, no grant is necessary for the current cycle).

Figure 4:
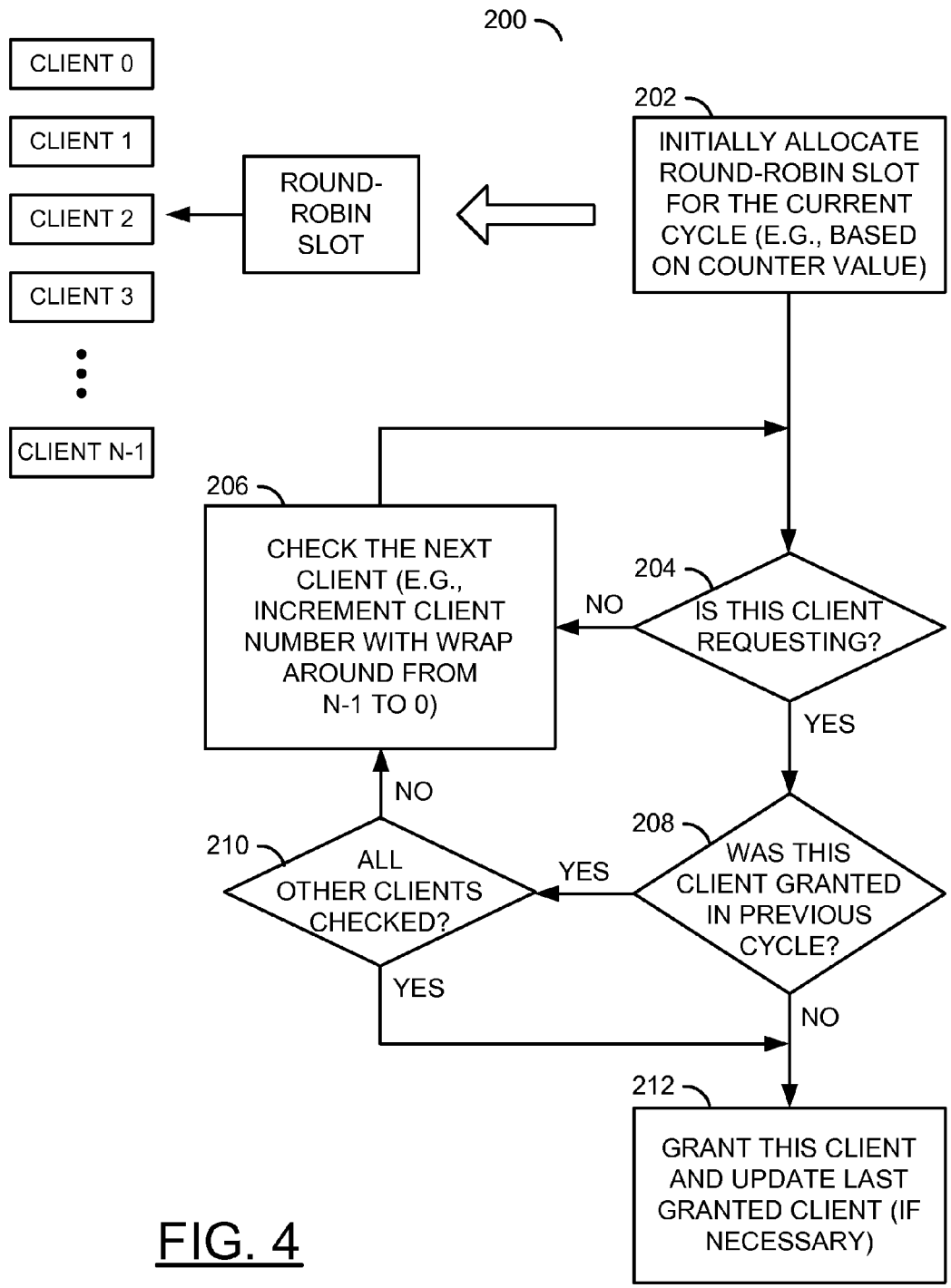
FIG. 4 is a flow diagram illustrating a process in accordance with an example embodiment of the present invention.

Referring to FIG. 4, a flow diagram is shown illustrating a process 200 in accordance with an example embodiment of the present invention. In one example, the process (or method) 200 may comprise a step (or block) 202, a step (or block) 204, a step (or block) 206, a step (or block) 208, a step (or block) 210, and a step (or block) 212. In the step 202, the process 200 may be configured to select which client is initially allocated the round-robin slot during a current cycle. For example, a counter may be implemented that tracks which client should be first in line in each cycle. The counter may be initialized at 0 at start-up and incremented each cycle. When the round-robin slot has been allocated, the process 200 may move to the step 204. In the step 204, the process 200 may be configured to determine whether the client allocated the round-robin slot in the step 202 is requesting access to the shared resource. If the client is not requesting access, the process 200 may move to the step 206. If the client is requesting access, the process 200 may move to the step 208.

In the step 206, the process 200 may reallocate the slot to another client. For example, the process 200 may increment the client number (e.g., with wraparound from N−1 to 0) and return to the step 204. As long as no requests are found, the process 200 may continue checking for requests from other clients until a request is found and the process 200 moves to the step 208, or all the clients have been checked. If no requests are found, no grant is issued for the current cycle.

In the step 208, the process 200 may determine whether the client that is currently requesting was granted in the last cycle. If the client was granted in the last cycle, the process 200 may move to the step 210. When the client that is currently allocated the round-robin slot was not granted in the last cycle, the process 200 may move to the step 212.

In the step 210, the process 200 checks whether all other clients have been checked for a request. If all other clients have been checked and the only client requesting is the client that was last granted, the process 200 moves to the step 212. If all other clients besides the last granted client have not been checked for a request, the process 200 moves to the step 206. In the step 212, the process 200 may grant the currently selected client access to the shared resource and update the last granted client information, if necessary.

Referring back to FIG. 2, all client requests in a cycle may be buffered in the register 120 (e.g., one bit per client). The register 120 may then be left-shifted one bit per cycle, with wrap-around, as illustrated in FIG. 3. In one example, the register 120 may be shifted by a pointer amount (e.g., represented by the signal SHIFT) so that the most significant (e.g., left most) bit indicates the request status of the client that is first in line for the particular cycle. Whether the client that is first in line for the particular cycle or another client is issued a grant may then be determined using the pseudo-round-robin technique described herein. After the grant is issued, the register 120 may be shifted back to the original form, and new request bits may be sampled.

If a fixed priority scheme were implemented, the granted client would always be the first active client (e.g., bit value being 1) starting from the MSB in the register 120. However, this may not be fair when only certain clients are requesting. For example, when a Client "A" and a Client "B" are the only clients requesting and Client A has a higher priority than Client B, Client A generally receives an unfair share of grants as illustrated in the following TABLE 1:

TABLE 1

| Cycle | Requesting Clients | Client Granted |
|---|---|---|
| 1 | 000ab | grant A |
| 2 | 00ab0 | grant A |
| 3 | 0ab00 | grant A |
| 4 | ab000 | grant A |
| 5 | b000a | grant B |
| 6 | 000ab | grant A |

With the conventional fixed priority scheme alone, Client A would be granted 4 times out of every 5 cycles, while Client B would be granted in only 1 cycle out of ever 5 cycles. Depending on positions of requesting clients and total number of clients, the unfairness may vary. In general, the fairness gets worse with fewer requesting clients.

The pseudo-round-robin scheme in accordance with the present invention solves the fairness problem of the conventional technique by taking into account a history of the previous grant. For example, another register (e.g., the register 122) may be added that is configured to remember the last granted client. The last granted client then may be masked out from the bit map search, as illustrated by the following TABLE 2:

TABLE 2

| Cycle | Requesting Clients | Granted Client |
|---|---|---|
| 1 | 000ab | grant A |
| 2 | 00(a)b0 <- A masked out; | grant B |

TABLE 2-continued

| Cycle | Requesting Clients | Granted Client |
|---|---|---|
| 3 | 0a(b)00 <- B masked out; | grant A |
| 4 | (a)b000 <- A masked out; | grant B |
| 5 | (b)000a <- B masked out; | grant A |
| 6 | 000(a)b <- A masked out; | grant B |

The arbiter implemented in accordance with the present invention generally allows the two clients to receive grants alternately.

The total cost in terms of circuitry for an arbiter in accordance with an embodiment of the present invention may be: One N-bit register, where N is the number of clients; One Log(2)N-bit register (to remember the last granted client number); Associated selecting logic, which is generally minimal.

The functions illustrated by the diagrams of FIGS. 1-4 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

As would be apparent to those skilled in the relevant art(s), the signals illustrated in FIG. 1 represent logical data flows. The logical data flows are generally representative of physical data transferred between the respective blocks by, for example, address, data, and control signals and/or busses. The system represented by the circuit 100 may be implemented in hardware, software or a combination of hardware and software according to the teachings of the present disclosure, as would be apparent to those skilled in the relevant art(s).

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) to meet the design criteria of a particular implementation. Additionally, inverters may be added to change a particular polarity of the signals.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
an interface configured to couple a plurality of clients to a shared resource; and
a control logic configured to remember which of the plurality of clients received a grant in a previous cycle and to determine which of the plurality of clients having a request in a current cycle receives a grant in the current cycle based upon a comparison of (i) which of the plurality of clients is first in line to receive the grant in the current cycle and (ii) which of the plurality of clients received the grant in the previous cycle, wherein the comparison is performed in each cycle and the grant in the current cycle is given to the client that received the grant in the previous cycle only when the client that received the grant in the previous cycle is the only client having a request in the current cycle.

2. The apparatus according to claim 1, wherein said requests are for access to said shared resource via said interface.

3. The apparatus according to claim 1, wherein the shared resource comprises a memory.

4. The apparatus according to claim 1, wherein said interface comprises a first register configured to store requests from said plurality of clients for said current cycle.

5. The apparatus according to claim 4, wherein said first register comprises a shift register configured to shift in response to a pointer value indicating which of the plurality of clients is first in line to receive the grant in the current cycle.

6. The apparatus according to claim 5, wherein said first register comprises a N-bit shift register, where the plurality of clients comprises N clients.

7. The apparatus according to claim 6, wherein said control logic further comprises a second register configured to store an indicator value indicating which of the plurality of clients received the grant in the previous cycle and said second register comprises a log(2)N bit register.

8. The apparatus according to claim 5, wherein said first register is (i) shifted from an original position based upon said pointer value to determine which of the plurality of clients having a request in the current cycle receives the grant and (ii) shifted back to the original position to store requests from the plurality of clients for a next cycle.

9. The apparatus according to claim 1, wherein said apparatus performs per cycle pseudo-round-robin arbitration of the requests from the plurality of clients and utilizes knowledge about which client received a grant in a previous cycle to maintain fairness.

10. The apparatus according to claim 1, wherein said control logic further comprises a counter configured to generate a pointer value indicating which of the plurality of clients is first in line to receive the grant in the current cycle.

11. The apparatus according to claim 10, wherein said counter keeps track of which of said plurality of clients is first in line for receiving a grant each cycle.

12. An apparatus comprising:
a means for interfacing a plurality of clients to a shared resource; and
a control means for determining which of the plurality of clients having a request in a current cycle receives a grant in the current cycle based upon a comparison of (i) which of the plurality of clients is first in line to receive the grant in the current cycle and (ii) which of the plurality of clients received the grant in a previous cycle, wherein the comparison is made in each cycle, the control means is configured to remember which of the plurality of clients received the grant in the previous cycle, and the grant in the current cycle is given to the client that received the grant in the previous cycle only when the client that received the grant in the previous cycle is the only client having a request in the current cycle.

13. A method for allocating access to a shared resource comprising:
maintaining a history of which of a plurality of clients was granted access to said shared resource in a previous cycle; and
determining which of the plurality of clients having a request in a current cycle receives a grant in the current cycle based upon a comparison of (i) which of the plurality of clients is first in line to receive the grant in the current cycle and (ii) the history of which of the plurality of clients was granted access in the previous cycle, wherein the comparison is performed in each cycle and the grant in the current cycle is given to the client that received the grant in the previous cycle only when the client that received the grant in the previous cycle is the only client having a request in the current cycle.

14. The method according to claim 13, wherein determining which of the plurality of clients having a request in the current cycle receives the grant comprises:
initially allocating a round-robin slot to one of the plurality of clients during the current cycle;
determining whether the client allocated the round-robin slot is requesting access to the shared resource;
if the client is not requesting access, reallocating the round-robin slot to a next client that is requesting access;

determining whether the client that is currently allocated the round-robin slot was granted access to the shared resource in the previous cycle;

if the client was granted access to the shared resource in the previous cycle, reallocating the round-robin slot to a next client that is requesting access; and when the client that is currently allocated the round-robin slot was not granted access to the shared resource in the previous cycle, granting the client that is currently allocated the round-robin slot access to the shared resource.

15. The method according to claim 13, wherein said requests for access to said shared resource in said current cycle and said history of which of said plurality of clients was granted access to said shared resource in said previous cycle are stored in an interface circuit coupling said plurality of clients to said shared resource.

16. The method according to claim 13, wherein the shared resource comprises a memory.

17. The method according to claim 16, further comprising providing the client that receives the grant access to a common memory interface coupled to said memory.

18. The method according to claim 13, further comprising storing said requests from said plurality of clients in the current cycle in a shift register, wherein said shift register is configured to shift in response to a pointer value indicating which of the plurality of clients is first in line to receive the grant in the current cycle.

19. The method according to claim 18, further comprising:

shifting said shift register from an original position based upon said pointer value to determine which of the plurality of clients having a request in the current cycle receives the grant; and shifting said shift register back to the original position and storing requests from the plurality of clients for a next cycle.

20. The method according to claim 18, further comprising using a counter to generate said pointer value in response to a cycle clock.

\* \* \* \* \*